Oct. 20, 1953  C. S. SMITH  2,656,495
SPRING WASHER
Filed Dec. 3, 1951  2 Sheets-Sheet 1
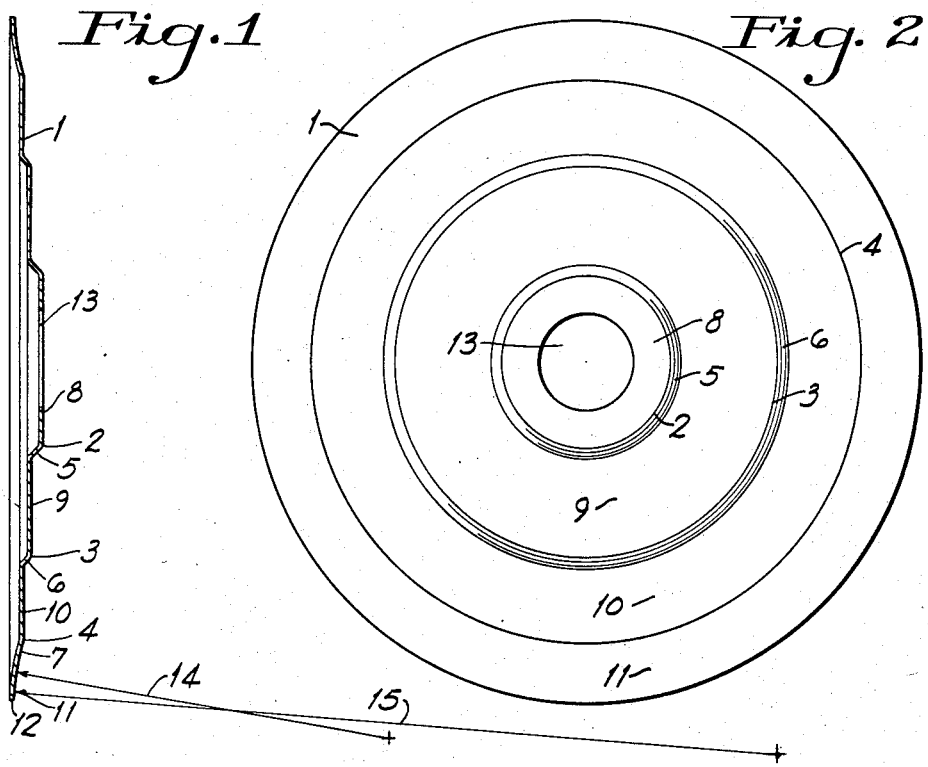
*Fig. 1*
*Fig. 2*
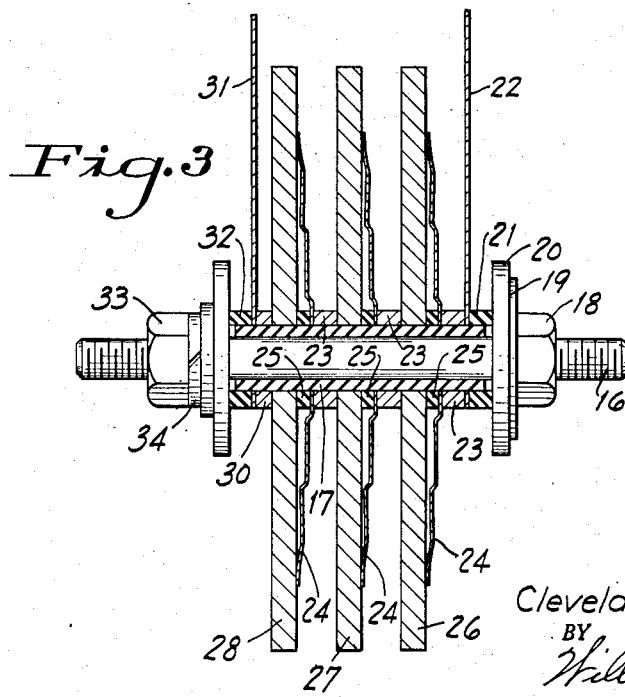
*Fig. 3*
INVENTOR.
Cleveland Scudder Smith
BY
William D. Carothers
His Attorney.

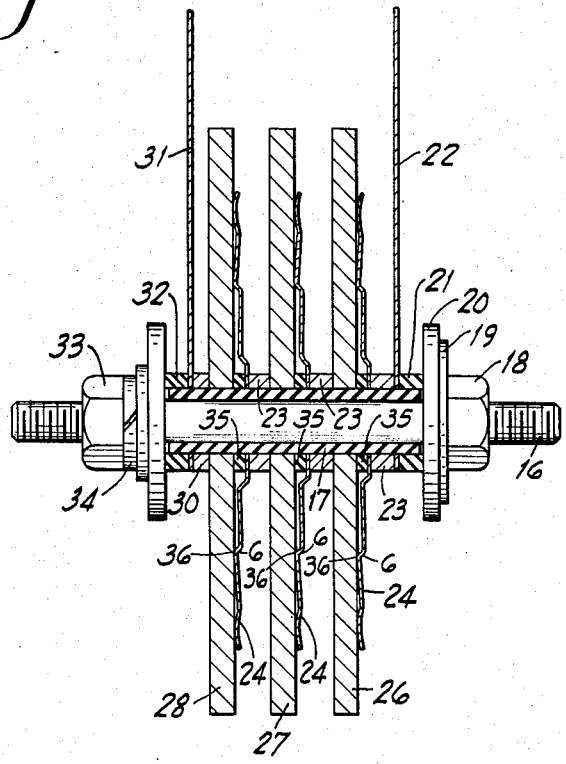

Patented Oct. 20, 1953

2,656,495

UNITED STATES PATENT OFFICE 2,656,495

SPRING WASHER

Cleveland S. Smith, Indiana, Pa., assignor to Syntron Company, Homer City, Pa., a corporation of Delaware Application December 3, 1951, Serial No. 259,627

5 Claims. (Cl. 317—234)

1

This invention relates generally to metal spring washers and more particularly to flexible metal spring washers for collecting current on dry disk rectifiers.

Heretofore it has been proposed to provide a conical sectionalized spring washer or a solid spring washer consisting of a nearly flat section and a conical section under which an insulating spacer is placed. This insulating washer must be ground to an exact dimension. If it is slightly too thick, the contact washer will touch only at the edge of the spring washer with a minimum of pressure. If the spacer washer is ground too thin the contact washer will engage the washer with an excess pressure tending to puncture the rectifying film thereon.

One object of this invention is to obtain maximum pressure adjacent the outer perimeter of the pressure washer without endangering the rectifying film.

Another object is the elimination of a close tolerance spacer insulating washer.

Still another object is the provision of a spring washer that requires a minimum raised area between the spring washer and the rectifier disk of an assembly, giving maximum space for cooling air between consecutive rectifier disks.

Another object is the provision of a current collecting spring washer that provides progressive contact from adjacent the perimeter of the spring washer resulting in progressively greater spring resistance without injury to the rectifying film.

Another advantage of this current collecting spring washer lies in the provision of a firm outer edge contact which also provides an efficient current collection member from the thin sprayed on alloy.

These characteristics of this spring washer eliminate any danger of puncturing or otherwise destroying the rectifying film.

Another object of this invention is the provision of a spring washer that will have no tendency to turn inside out under any compressive conditions.

A further object of this invention is the provision of a current collecting spring washer having two or more distinct contact rings with intermediate noncontacting regions. The outer contact ring seals the varnish and the intermediate noncontacting section prevents capillary flow of varnish into inner contact rings leaving them varnish-free and hence yielding a good electrical contact on the inner rings and safeguard the raising of the outer contact ring.

2

In accordance with the present invention, the spring washer is provided with a series of annular shoulders providing a terraced effect to give sufficient pressure on its outermost circular portion or contact ring, when assembled and pressure is applied adjacent the center of the spring washer. Aside from providing sufficient pressure on the outermost ring it creates a positive seal around the outer edge of the spring washer.

Unlike previous spring washers the spring washer comprising this invention has the advantage of applying predetermined pressure at its outer circumference. The terraced effect made by the series of shoulders gives the spring washers a more flexible spring action, eliminating the necessity of employing a close tolerance spacer washer, which present spring washers require. This coupled with the fact that this washer exerts maximum pressure on the outer circumference of the spring washer and then contacts at the next inwardly adjacent ring, instead of increasing the pressure on the outer contact ring, eliminates the danger of puncturing the rectifying film. Because of the flexibility of this spring washer it occupies less space after assembly, allowing maximum space between the rectifier disks for cooling air to circulate through the rectifier assemblies.

Other objects and advantages appear hereinafter in the following description and claims.

The accompanying drawing shows for the purpose of exemplification without limiting the invention or claims thereto, certain practical embodiments of the invention wherein:

Fig. 1 is a sectional view of the current collecting spring washer.

Fig. 2 is a plan view of the washer.

Fig. 3 is a view in side elevation with parts in section showing the current collecting spring washer as applied to a dry disk rectifier stack.

Fig. 4 is a view in section showing the second annular shoulder contacting the current collecting alloy on the dry disk rectifier.

Referring to the drawings the current collecting spring washer as shown in Figs. 1 and 2 is preferably made of brass or other suitable metal having good flexing characteristics and capable of transmitting current. The washer shown is approximately sixteen-thousandths of an inch thick and comprises the disk 1 having a series of annular shoulders 2, 3 and 4 which define terraced sections 5, 6 and 7. These shoulders and terraced sections in turn define the annular land sections 8, 9, 10 and 11. The outermost land section 11 may be slightly curved as noted on the drawings leaving very little difference between the shoulder 7 and the land section 11. However the perimeter 12 of the washer is flat or tangent to a transverse plane of the greatest diameter of the washer and each of the land sections 8, 9 and 10 is preferably substantially parallel to the same transverse plane.

The land section 8 is provided with an opening 13 for receiving the bolt in the assembly of the washer and the rectifier stack as shown in Fig. 3.

The curvature forming the shoulders 2 is preferably made of a radius of one-sixteenth of an inch and the shoulders 3 and 4 are one-eighth of an inch and they are substantially uniform with respect to one another. The radius at the bottom of the terrace 5 is likewise substantially one-sixteenth of an inch, whereas the radius at the bottom of the terrace 6 is approximately one-eighth of an inch and the radius of the terrace 7 is a combination curve having a two-inch and a four-inch radius, as indicated by the construction lines 14 and 15 on the drawing. The reason for having the greater radius of curvature in the terraces 6 and 7 is to provide a smooth rounded surface or arcuate surface for engagement on the metal alloy that is sprayed on the surface of the selenium oxide of a rectifier, since a selenium rectifier is used in this instance to illustrate the present invention.

The series of terraced land sections 8, 9 and 10 lie in planes which are offset progressively from the center of the disk outwardly and the central land section 8 is furthermost from the plane of greatest diameter that passes through the perimeter of the disk. It will also be noted that the terraces 5, 6 and 7 are each formed by reverse curves impressed in the stamping that forms the current collecting spring washer as shown in Figs. 1 and 2. The washer shown in Fig. 1 is free from pressure and is unflexed in its natural shape. However in Fig. 3 the three washers are mounted in assembled relation under pressure and are caused to flex as illustrated. Referring specifically to Fig. 3 the rectifier assembly is mounted on the bolt 16 which is shielded by the insulating tubular sleeve 17. The one end of the bolt is provided with a nut 18 which is drawn against the pressure washer 19 that is backed up by the insulating washer 20. A smaller insulating washer 21 is employed to space the conductor 22 from the large insulating washer 20. The center of the conductor 22 is blanked out for receiving the insulating tubing 17 as are all of the parts assembled on this rectifier with the exception of the nuts and the split lock washer at the end of the stack.

Inwardly of the terminal 22 is a metal spacer washer 23 and immediately adjacent the same is one of the current collecting spring washers 24, the central part of which is supported by the insulator washer 25 and the outer surface of which engages the alloy sprayed surface of the selenium rectifier disk 26. The opposite side of the rectifier disk 26 is supported by another metal washer 23 and the rectifier disks 27 and 28 are assembled similarly to that just described. The whole stack is mounted on the insulating tubing 17. Another metal washer 30 is provided on the opposite end of the disk 28 and the other electric terminal 31 is provided between the insulating washer 32 and the metal washer 30. The stack is held in place by the nuts 18 and 33 with the split lock washer 34.

The rectifier disks 26, 27 and 28, all being faced in the same direction, provide a single leg rectifier wherein the current flows from the electric terminal 31 to the electric terminal 32 and the electrons flow in the opposite direction. This type of a rectifier is known in the art as a single leg or half-wave rectifier and is employed to produce spaced current impulses from an alternating current source, when placed in series with the source and the load. It will be noted that the insulating washer 25 is rather small. As a matter of fact the washers are sixty-two thousandths of an inch in thickness and the insulating washers 25 do not have to be accurately ground owing to the fact that the flexibility of the current collecting washer is not dependent upon the exact thickness of this insulating washer and the thickness of the washer 25 may vary the degree of engagement between the current collecting spring washer. If the washer 25 is somewhat thinner the curvature of the terrace 7 may engage the surface of the rectifier disk, whereas if the washer 25 is greater in thickness only the outer perimeter 11 engages the sprayed alloy.

When a thinner insulating washer, such as illustrated at 35 in Fig. 4, is employed under the current collecting spring washer, the washers are further compressed until the under face of the terrace 6 engages the sprayed alloy surface of the rectifier disk as indicated at 36 and collects current therefrom. When contact is made at 36 any increased pressure due to a thinner washer merely increases the pressure on the alloy and the contact made by the outer portion 11 of the washer will not raise, which ordinarily would be raised off the surface upon increased pressure on the center by reason of the tilting of the washer on the meniscus functioning as a fulcrum and formed by the coating material such as the varnish used to coat the rectifier. With an ordinary conical current collecting washer the varnish passes by capillary attraction, or due to unevenness of the contact, under the perimeter of the spring washer and will accumulate in a larger mass as a meniscus. When this hardens and acts a fulcrum it is readily seen that additional pressure on the washer merely raises the perimetral edge out of contact thus breaking the circuit. This may happen if the insulating washer shrinks or gets thinner due to the constant pressure. This cannot happen to the washer comprising this invention as the second contact ring 36 prevents further movement of the outer ring and thus two contact rings are maintained.

I claim:

1. A current collecting spring washer for use on dry disk rectifiers comprising a flexible metal disk having a plurality of annular concentric shoulders forming terraces and defining an equal number of annular land sections each lying in planes offset progressively from the center of the disk outwardly, the central land section being furthermost from the plane of greatest diameter.

2. The structure of claim 1 characterized in that the outer perimeter of said disk merges into the outermost shoulder with an arc forming a reverse curve therewith.

3. The structure of claim 1 which also includes a rectifier cell surface member to be contacted in stacked relation whereon more than one of said shoulders make contact with the rectifier cell surface.

4. The structure of claim 3 characterized in that only two shoulders adjacent the perimeter make contact with the rectifier cell surface.

5. The structure of claim 3 characterized in that said current collecting spring washer has only two shoulders the outermost of which makes contact with said member to seal the inner shoulder against penetration of varnish, said inner shoulder also making good electrical contact with the surface and not impeded by any varnish film between said washer and said member.

CLEVELAND S. SMITH.

References Cited in the file of this patent

UNITED STATES PATENTS

| Number | Name | Date |
|---|---|---|
| 2,134,131 | Kipphan | Oct. 25, 1938 |
| 2,303,801 | Geel et al. | Dec. 1, 1942 |
| 2,453,618 | Blumenthal | Nov. 9, 1948 |
| 2,482,777 | Howe | Sept. 27, 1949 |